(12) United States Patent
Sada et al.

(10) Patent No.: US 7,629,079 B2
(45) Date of Patent: Dec. 8, 2009

(54) LITHIUM POLYMER SECONDARY BATTERY

(75) Inventors: Tsutomu Sada, Otsu (JP); Kazunari Takeda, Tsurugashima (JP); Yumiko Takashima, Tano-gun (JP); Naoto Nishimura, Kashihara (JP); Takehito Mitate, Yamatotakada (JP); Kazuo Yamada, Kitakatsuragi-gun (JP); Motoaki Nishijima, Gose (JP); Naoto Torata, Kashihara (JP); Kouichi Ui, Yamatotakada (JP)

(73) Assignees: Dai-Ichi Kogyo Seiyaki Co., Ltd., Kyoto (JP); Sharp Corporation, Osaka-Shi (JP)

( * ) Notice: Subject to any disclaimer, the term of this patent is extended or adjusted under 35 U.S.C. 154(b) by 786 days.

(21) Appl. No.: 10/381,517

(22) PCT Filed: Sep. 28, 2001

(86) PCT No.: PCT/JP01/08520

§ 371 (c)(1),
(2), (4) Date: Sep. 15, 2003

(87) PCT Pub. No.: WO02/29921

PCT Pub. Date: Apr. 11, 2002

(65) Prior Publication Data

US 2004/0043296 A1 Mar. 4, 2004

(30) Foreign Application Priority Data

Sep. 29, 2000 (JP) .............................. 2000-297766

(51) Int. Cl.
*H01M 4/00* (2006.01)

(52) U.S. Cl. .................. 429/189; 429/303; 429/309; 522/7; 522/18

(58) Field of Classification Search .................. 429/188, 429/189, 304
See application file for complete search history.

(56) References Cited

U.S. PATENT DOCUMENTS 4,935,330 A * 6/1990 Hofmann et al. ......... 430/281.1
4,987,055 A * 1/1991 Rode et al. ............... 430/277.1

FOREIGN PATENT DOCUMENTS

JP 6-96800 4/1994

(Continued)

OTHER PUBLICATIONS

Machine translation of JP 2000-251878, Sep. 14, 2000.*

(Continued)

*Primary Examiner*—Patrick Ryan
*Assistant Examiner*—Cynthia Lee
(74) *Attorney, Agent, or Firm*—Millen, White, Zelano, Branigan, P.C.

(57) ABSTRACT

A lithium secondary battery which comprises:
a negative electrode comprising as an active material a carbonaceous material capable of electrochemically holding/releasing lithium;
a positive electrode comprising as an active material a lithium chalcogenide;
and polymer electrolyte layers united respectively with the negative electrode and the positive electrode. The polymer electrolyte layers comprise an ionically conductive polymer matrix holding a nonaqueous electrolytic solution. They are obtained by crosslinking and polymerizing a liquid mixture of a monomeric precursor for the ionically conductive polymer and the nonaqueous electrolytic solution respectively on the negative electrode and the positive electrode using different polymerization initiators.

1 Claim, 1 Drawing Sheet

FOREIGN PATENT DOCUMENTS

| | | | |
|---|---|---|---|
| JP | 8-329983 | A | 12/1996 |
| JP | 10-158418 | A | 6/1998 |
| JP | 11-310405 | A | 11/1999 |
| JP | 2000-080138 | * | 3/2000 |
| JP | 2000-90925 | A | 3/2000 |
| JP | 2000-251878 | A | 9/2000 |

OTHER PUBLICATIONS

Machine translation of JP 8-329983, Dec. 13, 1996.*

The definition of carbon black. Academic press Dictionary of Science and Technology (1992) [retrieved on Mar. 22, 2007]. Retrieved from the Internet:<URL: http://www.xreferplus.com/entry/3082893>.*

* cited by examiner

LITHIUM POLYMER SECONDARY BATTERY

FIELD OF THE INVENTION

This invention relates to a lithium secondary battery comprising an ion-conductive polymer. More particularly, it relates to a lithium polymer secondary battery which comprises an anode having as an electroactive substance a carbonaceous material capable of electrochemically inclusion and release of lithium, a cathode having as an electroactive substance a lithium chalcogenide compound, and a polymer electrolyte layer comprised of a matrix of ion-conductive polymer retaining a nonaqueous electrolyte solution therein, said polymer electrolyte layer being disposed between the cathode and the anode.

BACKGROUND ART

Lithium secondary batteries have a higher energy density in theory compared to other batteries and thus allow to manufacture a small and light-weight battery. Therefore, vigorous studies have been focussed thereon to develop a power source of portable electronic instruments. Particularly, performance of such instruments are even increasing in recent years and their power source is required concominantly therewith to exhibit better discharging characteristics even at a high load. In order to fulfill these requirements, various studies are in progress next to the prior art battery using nonaqueous electrolyte solutions referred to as lithium ion battery to develop a battery using a polymer electrolyte that functions both as the nonaqueous electrolyte solution and the polymer separator of the prior art battery. Much interest has been focussed to a lithium secondary battery using the polymer electrolyte because of its remarkable advantages such as the possibility of making the battery smaller and thinner in size and lighter in weight as well as leak free.

A known type of the polymer electrolyte is comprised of a matrix of ion-conductive polymer retaining the nonaqueous electrolyte solution therein produced by polymerizing and cross-linking a precursor monomer of the ion-conductive polymer in the nonaqueous electrolyte solution. Whether the polymerization is heat polymerization or photopolymerization, a polymerization intiator must be used to generate a polymerization initiating specis. It was discovered, however, that some initiators may cause a chemical reaction to adversely affect the battery performance including the discharging capacity under load and charge-discharge cycle characteristics during repeated cycles when the initiator remains after the polymerization.

Since a certain quantity of the initiator is indispensable to produce a polymer electrolyte gel having a satisfactory mechanical strength, it is practically inevitable for the polymer electrolyte to contain an amount of residual initiator. JP-A-1015848 discloses to decrease the level of residual initiator by decomposing thermally or ultrasonically. However, it is practically impossible to completely decompose the initiator by this treatment and the problem of residual initiator still remains to exist and the battery performance will be adversely affected depending on the nature of initiator used as discussed above.

JP-A-8287890 disclsoes that when a phosphine oxide-based initiator is used in a photocurable resin applied to the sealing areas of battery openings and the insulating areas of both anode and cathode terminals, it is possible to improve the strength of the sealing area and also the insulation of anode and cathode. This proposal is not related to the improvement of the performance of polymer electrolyte.

Accordingly, the problem to be solved by the present invention is to eliminate or ameliorate any adverse effect of the residual initiator on the battery performance.

DISCLOSURE OF THE INVENTION

The present invention relates to a lithium polymer secondary battery comprising a cathode having a layer of electroactive substance comprised of a lithium chalcogenide compound, an anode having a layer of electroactive substance comprised of a carbonaceous material capable of inclusion and release of lithium and a pair of polymer electrolyte layers each formed integrally with the respective electrode. The inventive battery is characterized in that said pair of polymer electrolyte layers are each comprised of a matrix of a crosslinked, ion-conductive polymer retaining a nonaqueous electrolyte solution, and that the polymerization initiator of said ion-conductive polymer on the anode side is different from the initiator of said ion-conductive polymer on the cathode side.

Specifically, it is preferable that the initiator on the anode side be excellent in the anti-reducing property while the initiator on the cathode side is excellent in the anti-oxidation property. As a consequence of this, insufficient inclusion of lithium ions into the anodic electroactive substance owing to the consumption of lithium ions by the residual initiator during the initial charge stage is prevented to ensure to achieve a high energy density.

It is also preferable to employ the respective initiators such that the initiator gives a capacity retention rate over cycle close to the original capacity retention rate within the dynamic potential range of the respective electrodes since the dynamic potential range is different between the cathode and the anode. This enables any adverse effect of the initiator on the cycle characteristics of the battery to be eliminated or ameliorated.

BEST MODE FOR CARRYING OUT OF THE INVENTION

Figure 1:
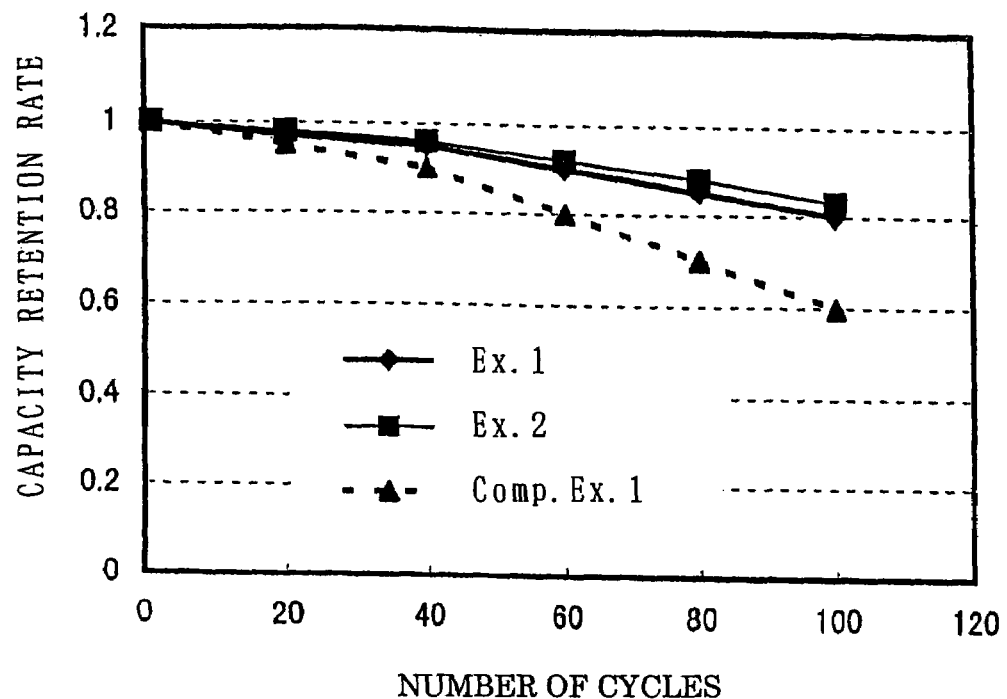
FIG. 1 is a graph showing the cycle characteristics of the battery according to the present invention in Example 1 and Example 2, respectively in comparison with the battery according to Comparative Example 1.

The battery of the present invention may be manufactured by forming an ion-conductive polymer layer separately on a pre-fabricated cathode and anode and joining the layers together although the manufacturing process is not limited thereto.

Basically, the anode and cathode comprise a current collector in the form of a metal foil and an electroactive substance of the respective electrode bound with a binder material. The materials of the collector foil include aluminum, stainless steel, titanium, copper, nickel and the like. Aluminum and copper are employed for the cathode and the anode, respectively in consideration of their electrochemical stability, ductility and economy.

Although metal foils are mainly shown herein as the form of anode and cathode collectors, other forms such as mesh, expanded metals, laths, perforated sheets or plastic films having a coating of an electron-conductive material may be employed although the form of collector is not limited thereto.

The electroactive substance of the anode is a carbonaceous material capable electrochemically inclusion and release of lithium. Typical examples thereof include particles (flakes, aggregates, fibers, whiskers, beads of ground particles) of natural or artificial graphite. Artificial graphite produced by graphitizing mesocarbon beads, mesophase pitch powder or isotropic pitch powder may also be used.

With regard to the electroactive substance used in the present invention, it is more preferable to use as the carbonaceous material graphite particles having attached to the surfaces thereof amorphous carbon particles. These particles may be obtained by dipping the graphite particles in a coal-based heavy oil such as pitch or a petroleum-based heavy oil and heating recovered graphite particles to a temperature above the carbonizing temperature to decompose the heavy oil, if necessary, followed by milling. Such treatment significantly retards the decomposition reaction of the nonaqueous electrolyte solution and the lithium salt occurring at the anode during the charge cycle to enable the charge and discharge cycle life to be improved and also the gas evolution due to the above decomposition reaction to be prevented. In the above carbonaceous material, micropores contributing to increase in BET specific area have been filled with the attached carbon particles derived from the heavy oil. The specific surface area thereof is generally below 5 $m^2/g$, preferably in the range between 1 to 5 $m^2/g$. Greater specific surface areas are not preferable because increased contacting surface area with the ion-conductive polymer makes undesired side reactions to be taken place more easily.

The cathodic electroactive substance to be used in the present invention in conjunction with the carbonaceous anodic active substance is preferably selected from a composite oxide of laminar or spinel structure represented by the formula: $Li_a(A)_b(B)_cO_2$ wherein
  A is a transition metal element;
  B is an element selected from the group consisting of a non-metal or semi-metal element of group 3B, 4B and 5B of the periodic chart, an alkaline earth metal, Zn, Cu and Ti;
  a, b and c are numbers satisfying the following relationship:

$0 < a \leq 1.15$ $0.85 \leq b+c \leq 1.30$, and $c > 0$

Typical examples of the composite oxides include $LiCoO_2$, $LiNiO_2$ and $LiCoxNi_{1-x}O_2$ ($0 < x < 1$). Use of these compounds in conjunction with a carbonaceous material as a anodic electroactive substance is advantageous in that the battery exhibits a practically acceptable dynamic voltage even when the voltage variation generated by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

When preparing the anode and cathode, the respective electroactive substances may be combined, where necessary, with a chemically stable conductor material such as graphite, carbon black, acetylene black, carbon fiber or conductive metal oxides to improve the electron conductivity thereof.

The binder is selected among those thermoplastic resins which are chemically stable, soluble in a suitable solvent but hardly attacked with the nonaqueous electrolyte solution. A variety of such thermoplastic resins have been known. For example, polyvinylidene fluoride (PVDF) may preferably be used since this resin is selectively soluble in N-methyl-2-pyrrolidone. Other examples of usable thermoplastic resins include polymers and copolymers of acrylonitrile, methacrylonitrile, vinyl fluoride, chloroprene, vinyl pyridine and its derivatives, vinylidene chloride, ethylene, propylene and cyclic dienes (e.g. cyclopentadiene, 1,3-cyclohexadiene). A dispersion of the binder resin may also be used in place of a solution.

The electrode may be produced by kneading the respective electroactive substances and, where necessary, the conductor material with a solution of the binder resin to prepare a paste, applying the paste on a metal foil using a suitable coater to form a film of uniform thickness, and compressing the film after drying. The proportion of the binder resin in the electroactive substance layer should be minimum and generally lies from 1 to 15% by weight. The proportion of the conductor material usually lies, when used, from 2 to 15% by weight of the electroactive substance layer.

The polymer electrolyte layer is formed on the respective electroactive substance layers thus prepared integrally therewith. The polymer electrolyte layer is comprised of a matrix of an ion-conductive polymer impregnated with or retaining a nonaqueous electrolyte solution containing a lithium salt. The polymer electrolyte layer occurs macroscopically in a solid state but microscopically retains a continuous phase of the lithium solution formed therein in situ. The polymer electrolyte layer of this type has an ion-conductivity higher than that of the corresponding polymer electrolyte free from the lithium solution.

The polymer electrolyte layer may be formed by polymerizing (heat polymerization, photopolymerization etc.,) a precursor monomer of the ion-conductive polymer in the form of a mixture with the nonaqueous electrolyte solution containing a lithium salt.

The monomer component of the above mixture which can be used for this purpose should include a polyether segment and also be polyfunctional in respect to the polymerization site so that the resulting polymer forms a three dimensional crosslinked gel structure. Typically, such monomers may be prepared by esterifying the terminal hydroxyl groups with acrylic or methacrylic acid (collectived called "(meth)acrylic acid"). As is well known in the art, polyether polyols are produced by addition-polymerizing ethylene oxide (EO) alone or in combination with propylene oxide (PO) using an initiator polyhydric alcohol such as ethylene glycol, glycerine or trimethylolpropane. A monofunctional polyether polyol (meth)acrylate may be used in combination with polyfunctional monomers.

The poly- and monofunctional monomers are typically represented by the following general formulas:

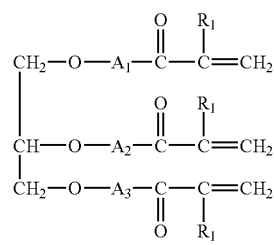

wherein $R_1$ is hydrogen or methyl;

$A_1$, $A_2$ and $A_3$ are each a polyoxyalkylene chain containing at least 3 ethylene oxide (EO) units and optionally some propylene oxide (PO) units such that PO/EO=0.25 and EO+PO≧35.

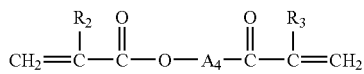

wherein $R_2$ and $R_3$ are hydrogen or methyl;

$A_4$ is a polyoxyalkylene chain containing at least 3 EO units and optionally some PO units such that PO/EO=0-5 and EO+PO≧10.

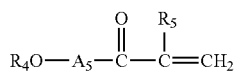

wherein $R_4$ is a lower alkyl, $R_5$ is hydrogen or methyl, and $A_5$ is a polyoxyalkylene chain containing at least 3 EO units and optionally some PO units such that PO/EO=0-5 and EO+PO≧3.

The nonaqueous electrolyte solution is prepared by dissolving a lithium salt in a nonpolar, aprotic organic solvent. Non-limitative examples of the lithium salt solutes include $LiClO_4$, $LiBF_4$, $LiAsF_6$, $LiPF_6$, LiI, LiBr, $LiCF_3SO_3$, $LiCF_3CO_2$, $LiNC(SO_2CF_3)_2$, $LiN(COCF_3)_2$, $LiC(SO_2CF_3)_2$, LiSCN and mixtures thereof.

Non-limitative examples of the organic solvents include cyclic carbonate esters such as ethylene carbonate (EC) or propylene carbonate (PC); straight chain carbonate esters such as dimethyl carbonate (DMC), diethyl carbonate (DEC) or ethyl methyl carbonate (EMC); mactones such as γ-butyrolactone (GBL); esters such as methyl propionate or ethyl propionate; ethers such as tetrahydrofuran and its derivatives, 1,3-dioxane, 1,2-dimethoxyethane, or methyl diglyme; nitrites such as acetonitrile or benzonitrile; dioxolane and derivatives thereof; sulfolane and derivatives thereof; and mixtures of these solvents.

Since the polymer electrolyte on the electrode, particularly on the carbonaceous material of the anode is required to contain a nonaqueous electrolyte solution of which side reactions with the graphite-based carbonaceous material are retarded, it is preferable to use a solvent system consisting primarily of EC and another solvent selected from PC, GBL, EMC, DEC or DMC. For example, a nonaqueous electrolyte solution containing 3 to 35% by weight of a lithium salt dissolved in the above solvent mixture containing 2 to 50% by weight of EC exhibits a satisfactory ion conductivity even at low temperatures.

The proportion of the nonaqueous solution in the mixture with the precursor monomer should be large enough to maintain the solution as continuous phase in the crosslinked polymer electrolyte layer but should not be so excessive to undergo phase separation and bleeding of the solution from the gel. This can be accomplished by the ratio of the monomer to the electrolyte solution generally within a range from 30/70 to 2/98, preferably within a range from 20/80 to 2/98 by weight.

The polymer electrolyte layer may optionally include a porous substrate as a support member. Such substrate may be either a microporous membrane made from a polymer which is chemically stable in the nonaqueous electrolyte solution e.g. polypropylene, polyethylene or polyester, or a sheet (i.e. paper or nonwoven fabric) made from fiber of such polymers.

It is preferable, that the substrate has a air permeability from 1 to 500 sec./cm³ and can retain the polymer electrolyte therein at a substrate: polymer electrolyte ratio from 91/9 to 50:50. This is necessary to achieve an optimum balance between the mechanical strength and the ion conductivity.

When the substrate is not used, the polymer electrolyte layer integral with the respective electrodes may be fabricated by casting the mixture of the precursor monomer and the nonaqueous electrolyte solution on the respective electroactive substance layers to form a film and polymerization the monomer in situ. Then both electrodes are joined together with their polymer electrolyte layers facing inwardly.

When used, the substrate is applied on the electroactive substance layer of either one of the electrodes. Then the mixture of the precursor monomer and the electrolyte solution is cast on the substrate followed by polymerization of the monomer in situ to form the polymer electrolyte layer integral with the substrate and the electrode. This electrode is joined together with the other electrode including the polymer electrolyte layer free of the substrate formed as above with their polymer electrolyte layers facing inwardly.

The above methods are preferred since they insure to form the polymer electrolyte layer integral with the electrode and the substrate, when used, in a simple manner.

The mixture of the precursor of ion-conductive polymer (monomer) and the nonaqueous electrolyte solution containing a lithium salt contains a suitable polymerization initiator depending on the polymerization method, e.g. a peroxide type or azo type initiator for heat polymerization and a photoinitiator such as acetophenone, benzophenone or phosphine series for photopolymerization. The polymerization initiator may be used in an amount from 100 to 1,000 ppm and should not be used in excess for the reason as stated before.

According to the invention, different polymerization initiators are used in the polymer electrolyte on the cathods side and the polymer electrolyte on the anode side while considering the electrochemical reaction occurring at the respective electrodes and the dynamic potential range thereof.

Because photopolymerization (UV cure) enables ambient temperature-curing in a short period of time in continuous fashion, the criteria for the selection of particular initiators are described below taking photoinitiators as examples.

When considering the electrochemical reactions occurring at cathode and anode respectively as above, it is preferable to select an anti-reductive initiator for the anode and an anti-oxidative initiator for the cathode. Whether a particular initiator is anti-reductive or anti-oxidative is predictable from its chemical structure. For example, bis(2,4,6-trimethylbenzyl) phenylphosphine oxide is easily reduced to the corresponding phosphine. Thus, it is predictable that this initiator is not suitable for the anode side but suitable for the cathode side.

It is also possible to determine empirically which electrode side is suited for a given initiator. This method is carried out using an experimental battery comprising the actual cathode or anode, a suitable counter reference electrode and a nonaqueous electrolyte solution in place of the polymer electrolyte. Then about 1,000 ppm of an initiator to be tested is added to the electrolyte solution and a potential at which the oxidation-reduction current flows using cyclic voltammetry (CV). For use on the anode side a compound exhibiting a low oxidation-reduction current level in the anode dynamic potential range of from 0 to 1.2 V vs. Li/Li⁺ is selected. For use on the cathode side a compound exhibiting a low oxidation-reduction current level in the cathode dynamic potential range of, for example, from 2.5 to 4.2 V vs. Li/Li⁺ is selected although this range may vary depending on the nature of particular electroactive substance. Since quantization of the oxidation-reduction current value is difficult to perform using the CV measurement due to varying effective surface area and other valiants of the electrode, the method only provides a relative comparison among numerous initiators and, therefore, requires to repeat the test many times.

A much simpler method also uses the above experimental battery. Instead of CV measurement, this method determines the charge-discharge characteristics of the test system in a single electrode test and then compares with data determined on the reference system free from any initiator. Specifically charge-discharge cycle is repeated e.g. 100 times within the dynamic potential range of the respective electrodes. A given initiator may be judged to be practically free of any adverse effect on the battery performance if the capacity retention rate of the experimental battery at the end of charge-discharge cycles is not less than 80%, preferable not less than 90%, more preferably not less than 95% of the corresponding capacity retention rate of the reference battery of the initiator free system.

Using this single electrode test, we have determined that a phosphine oxide initiator such as bis(2,4,6-trimethylbenzoyl) phenylphosphine oxide or bis(2,6-dimethoxybenzoyl)-2,4,4-trimethylpentylphosphine oxide is suitable for the cathode side while an acetophenone initiator such as 2,2-dimethoxy-2-phenylacetophenone is suitable for the anode side.

An initiator of the phosphine oxide type has a larger width in the light absorption region compared to initiators of other types and is capable of curing the surface layer of the polymer electrolyte or gel at higher wavelength regions and also capable of curing the deep portions thereof at lower wavelength regions. When the precursor of ion-conductive polymer is polymerized on the electrode and/or separator substrate using this type of initiators, it is possible, therefore, to polymerize not only the precursor in the surface layer but also the precursor penetrated into micropores of the porous electrode material and the substrate effectively. This enables the levels of the precursor monomer and the initiator remaining in the electrode and the separator to be lowered so that the residual precursor and initiator do not affect the battery performance adversely.

It is rare in practice that the residual initiator level is as high as 1,000 ppm. However, a satisfactory cycle performance could be achieved even in the battery containing such high residual initiator levels if the capacity retention rate is not less than 80% of the capacity retention rate of the initiator-free system in the above single electrode test.

Examples of other initiators that exhibit a satisfactory cycle performance on the anode side include those of benzoin type such as benzoyl propyl ether, and of phenyl ketone type such as 2,2-diethoxy-2-phenylaceto-phenone, 1-hydroxycyclohexyl phenyl ketone, benzophenone or diethoxybenzophenone.

Although photoinitiators of other types are known in the art including aryldiazonium salt type, diaryliodonium salt type, triarylsulfonium salt type and triarylcelenium salt type, the adaptability of these initiators to either electrode could be determined by the CV measurement or the single electrode test as described above. The selection of a suitable initiator to be used on either electrode side could be possible by other methods than the CV measurement or the single electrode test.

EXAMPLE

The following Examples are for illustrative purpose only and not intended to limit the scope of the present invention thereto.

Example 1

1) Fabrication of Anode 100 weight parts of artificial graphite (d002=0.336, average particle size=12 μm, R=0.15, specific surface area=4 m²/g) were taken in a mortar and milled with a solution of 9 weight parts of polyvinylidene fluoride (PVDF) dissolved in an appropriate amount of N-methylpyrrolidone (NMP). The resulting paste was applied onto a copper foil of 20 μm thickness, dried and compressed. The foil was cut into 3.5×3.0 cm size before applying the paste in 3×3 cm area. A nickel foil of 50 μm thickness was welded to the uncoated edge of the copper foil as a lead. The total thickness of the anode was 85 μm.

2) Fabrication of Polymer Electrolyte Layer on Anode

LiPF$_6$, was dissolved to 1 mol/L concentration in a 1:1 mixture by volume of ethylene carbonate (EC) and ethyl methyl carbonate (EMC) to prepare a nonaqueous electrolyte solution.

To 90 weight parts of this solution were added 10 weight parts of a trifunctional polyether polyol triacrylate (MW=7500-9000) of the formula:

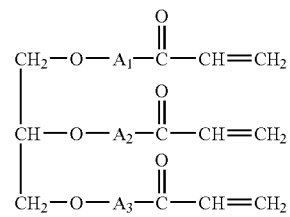

wherein $A_1$, $A_2$ and $A_3$ are each polyoxyalkylene chain containing at least 3 EO units and at least one PO unit in PO/EO ratio of 0.25. For use in fabricating the polymer electrolyte on the anode side, 2,2-dimethoxy-2-phenylacetophenon was added to the monomer-electrolyte solution mixture at a concentration of 1,000 ppm.

A polyester nonwoven fabric (thickness=25 μm, air permeability=380 sec/cm³) was used as a support of the polymer electrolyte layer.

Then the monomer-electrolyte solution mixture was poured onto the anode and the substrate placed on a plate side-by-side to impregnate them with the mixture. After laminating the substrate on the anode, the assembly was irradiated with UV radiation of 365 nm wavelength at an intensity of 30 mW/cm² for 3 minutes to form a gelled polymer electrolyte layer integrally with the anode and the substrate.

3) Fabrication of Cathode 100 weight parts of LiCoO$_2$ having an average particle size of 7 μm and 5 weight parts of acetylene black were taken in a mortar and milled with a solution of 5 weight parts of PVDF dissolved in an appropriate amount of NMP. The resulting paste was applied on an aluminum foil of 20 μm thickness, dried and compressed. The foil was cut into 3.5×3.0 cm size before applying the paste in 3×3 cm area. An aluminum foil of 50 μm thickness was welded to the uncoated edge of the electrode foil as a lead. The total thickness of the cathode was 80 μm.

4) Fabrication of Polymer Electrolyte Layer on Cathode

For use in fabricating the polymer electrolyte layer on the cathode, bis(2,4,6-trimethylbenzoyl)phenylphosphine oxide (BTBPPO) was added at a concentration of 500 ppm to the same monomer-electrolyte solution mixture as used in the preparation of the polymer electrolyte layer on the anode. The cathode prepared in 3) was then impregnated with this monomer-electrolyte solution mixture and the impregnated cathode was irradiated with UV radiation of 365 nm wavelength at an intensity of 30 mW/cm$^2$ for 3 minutes to form a gelled polymer electrolyte layer integrally with the cathode.

5) Assembly of Battery

The cathode and the anode each having a polymer electrolyte layer formed integrally therewith by the above procedures were joined together with their polymer electrolyte layers facing inwardly to produce a battery.

6) Single Electrode Test for Evaluating the Effect of Initiator

A single electrode test was carried out for the anode using the anode prepared by the above process, lithium metal as a counter electrode and the monomer-free electrolyte solution as prepared above containing 1,000 ppm of DMPA as a liquid electrolyte. A charge-discharge cycle was repeated 100 times at a constant current of 30 mA/g in a potential range from 1.5 to 0.02 V vs.Li/Li$^+$. The capacity retention rate was measured at the end of the charge-discharge cycles and compared with the capacity retention rate of the initiator-free system measured under the same conditions. The value of the initiator-containing system was greater than 90% of the capacity retention rate of the initiator-free system.

Similarly, the single electrode test was carried out for the cathode as prepared above using lithium metal as a counter electrode and the monomer-free electrolyte solution as prepared above containing 1,000 ppm of BTBPPO. A charge-discharge cycle was repeated 100 times at a constant current of 27.4 A/g in a potential range from 4.2 to 2.75 V vs. Li/Li$^+$. The capacity retention rate of the initiator-containing system was greater than 90% of the capacity retention rate of the initiator-free system.

Comparative Example 1

Example 1 was repeated except that the polymer electrolyte layer was formed on the cathode using the same monomer-electrolyte solution mixture containing 1,000 ppm of DMPA as used for the anode. The relative percentage of the capacity retention rate of the cathode compared to the capacity retention rate of the initiator-free system was less than 80% in the single electrode test.

As is apparent from the results of Example 1 and Comparative Example 1, it was found that use of BTBPPO as a polymerization initiator on the cathode side improved the curing rate of the precursor monomer within the cathode, and decreased the residual monomer and initiator levels thereby to lead to decreased deterioration in the battery performance over repeated cycles.

Example 2

Example 1 was repeated except that 500 ppm of 1-hydroxylcyclohexyl phenyl ketone was used instead of 1,000 ppm of DMPA as the initiator for the anode side. The single electrode test of the anode revealed percent capacity retention compared to the capacity retention of the initiator-free system of greater than 90%.

Example 3

Example 2 was repeated except that the anode electroactive substance was a carbonaceous material consisting of graphite particles having attached to the surfaces amorphous carbon particles and having a specific surface area of 2 m$^2$/g and a particle size of 15 µm. The single electrode test of the anode revealed percent capacity retention compared to the capacity retention of the initiator-free system of greater than 90% as in Example 2.

Example 4

Example 2 was repeated except that artificial graphite particles having a specific surface area of 1.8 m$^2$/g and a particle size of 15 mµ prepared by graphitizing mesocarbon microbeads were used as the anode electroactive substance. The single electrode test of this anode revealed percent capacity retention compared to the capacity retention of the initiator-free system of greater than 90% as in Example 2.

Example 5

Example 1 was repeated except that 1,000 ppm of bis(2,6-dimethoxybenzoyl)-2,4,4-trimethylpentylphosphine oxide was used to form the polymer electrolyte layer on the cathode side. The single electrode test of this cathode showed percent capacity retention compared to the capacity retention of the initiator-free system of greater than 90%.

As is apparent from the results of Example 5 and Comparative Example 1, it was found that use of the initiator of phosphine oxide type used in Example 5 on the cathode side improved the curing rate of the precursor monomer within the cathode and decreased the residual monomer and initiator levels thereby to lead to decreased deterioration in the battery performance over repeated cycles.

Comparative Example 2

Comparative Example 1 (initiator was 1,000 ppm of DMPA on both anode and cathode sides) was repeated except that artificial graphite particles having a specific surface area of 10 m$^2$/g and a particle size of 15 µm were used as the anode electroactive substance. The single electrode test showed percent capacity retention compared to the capacity retention of the initiator-free system of less than 85% for the anode and greater than 90% for the cathode, respectively.

Comparative Example 3

Comparative Example 2 was repeated except that the formulation of the cathode electroactive substance was altered to 100 weight parts of LiCoO$_2$, 15 weight parts of acetylene black and 10 weight parts of PVDF. The single electrode test showed percent capacity retention compared to the capacity retention of the initiator-free system of less than 85% for both the anode side and the cathode side.

Evaluation of Battery Performance:

Batteries produced in Examples and Comparative Examples were charged initially at a constant current of 4.9 mA until the battery voltage reached 4.1 V. Thereafter the charge was continued at constant current and voltage for 10 hours. Then the batteries were discharge at a constant current of 4.0 mA until the battery voltage decreased to 2.75 V. This charge-discharge cycle was repeated and the discharge capacity was determined after initial 3 cycles and every 20 cycles thereafter. The rate of capacity retention was calculated each time in terms of fraction of the initial capacity. The results of batteries of Example 1, Example 2 and Comparative Example 1 are shown in the graph of FIG. 1 and the results of batteries of Example 3, Example 4, Comparative Example 2 and Comparative Example 3 are shown in the graph of FIG. 2.

Figure 2:
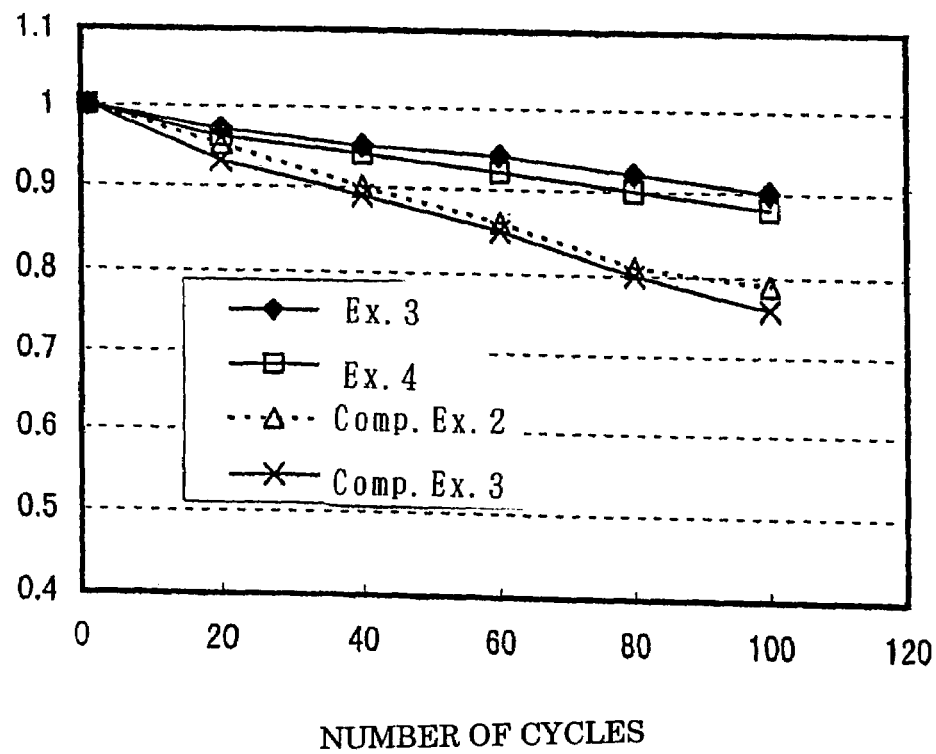
FIG. 2 is a graph showing the cycle characteristics of the battery according to the present invention in Example 3 and Example 4, respectively in comparison with the battery of Comparative Example 2 and Comparative Example 3.

As FIGS. 1 and 2 show, the capacity retention relative to the initial capacity is improved by selecting two different initiators between the anode side and the cathode side which are suited for use in the respective electrodes.

The invention claimed is:

1. A lithium polymer secondary battery comprising an anode having a layer of electroactive substance comprised of a carbonaceous material capable of inclusion and release of lithium, a cathode having a layer of electroactive substance comprised of a chalcogenide compound containing lithium, and a pair of polymer electrolyte layers each formed integrally with the respective electrodes, wherein the pair of polymer electrolyte layers is each comprised of a matrix of a cross-linked, ion-conductive polymer retaining a nonaqueous electrolyte solution, wherein said polymer electrolyte layers each contain an amount of a unreacted polymerization initiator remaining after polymerization of a precursor monomer of said ion-conductive polymer, the initiator in each layer being different from and exclusive of the initiator in the other layer and wherein said polymerization initiator remaining in the polymer electrolyte layer on the cathode side is a phosphine oxide photopolymerization initiator, while the polymerization initiator remaining in the polymer electrolyte layer on the anode side is an acetophenone, benzoin or phenyl ketone photoinitiator.

* * * * *

UNITED STATES PATENT AND TRADEMARK OFFICE
CERTIFICATE OF CORRECTION

| | | |
|---|---|---|
| PATENT NO. | : 7,629,079 B2 | Page 1 of 1 |
| APPLICATION NO. | : 10/381517 | |
| DATED | : December 8, 2009 | |
| INVENTOR(S) | : Sada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Second Day of November, 2010

David J. Kappos
*Director of the United States Patent and Trademark Office*